(12) United States Patent
Sun et al.

(10) Patent No.: US 8,563,630 B2
(45) Date of Patent: Oct. 22, 2013

(54) DRY ADHESIVE AND METHOD OF PREPARING THE SAME

(75) Inventors: Danjiu Sun, Wuhan (CN); Shuangfeng Wu, Wuhan (CN); Yingfan Xiang, Wuhan (CN); Kunwen Du, Wuhan (CN)

(73) Assignee: Wuhan Keda Marble Protective Materials Co., Ltd., Wuhan (CN)

( * ) Notice: Subject to any disclaimer, the term of this patent is extended or adjusted under 35 U.S.C. 154(b) by 222 days.

(21) Appl. No.: 12/765,099

(22) Filed: Apr. 22, 2010

(65) Prior Publication Data
US 2010/0204366 A1   Aug. 12, 2010

Related U.S. Application Data

(63) Continuation of application No. PCT/CN2008/072225, filed on Sep. 1, 2008.

(30) Foreign Application Priority Data

Nov. 8, 2007 (CN) .......................... 2007 1 0053792

(51) Int. Cl.
*C08G 59/50* (2006.01)
(52) U.S. Cl.
USPC ....................................... 523/400
(58) Field of Classification Search
USPC ....................................... 523/400
See application file for complete search history.

(56) References Cited

U.S. PATENT DOCUMENTS

| 5,212,242 | A  * | 5/1993 | Gross et al. ................... 525/162 |
| 5,321,063 | A  * | 6/1994 | Shimada et al. ................. 524/37 |
| 5,425,824 | A  * | 6/1995 | Marwick ......................... 156/64 |
| 5,498,663 | A  * | 3/1996 | Shimada et al. ............. 525/54.3 |
| 6,402,434 | B1 * | 6/2002 | Surjan et al. ............... 405/259.5 |
| 6,444,725 | B1 * | 9/2002 | Trom et al. .................... 523/118 |
| 2006/0189736 | A1 * | 8/2006 | Mori et al. .................... 524/404 |
| 2007/0146887 | A1 * | 6/2007 | Ikeda et al. ................... 359/586 |
| 2007/0148338 | A1 * | 6/2007 | Dellrup ......................... 427/140 |
| 2007/0178297 | A1 * | 8/2007 | Takada et al. ................. 428/323 |

* cited by examiner

*Primary Examiner* — Mark Eashoo
*Assistant Examiner* — Megan McCulley
(74) *Attorney, Agent, or Firm* — Matthias Scholl P.C.; Matthias Scholl

(57) ABSTRACT

A dry adhesive consisting at least of component A and component B. Component A being red in color and consisting of at least an epoxy resin, a coupling agent, an active diluting agent, an inorganic filler, and a red organic paste. Component B being green in color and consisting of at least an organic compound-modified amine as a curing agent, the coupling agent, the inorganic filler, an accelerator, a thickener, the active diluting agent, and a green organic paste. Also provided is a preparation method for the dry adhesive. The dry adhesive has high strength, good weather resistance, and is easy to prepare.

4 Claims, No Drawings

DRY ADHESIVE AND METHOD OF PREPARING THE SAME

CROSS-REFERENCE TO RELATED APPLICATIONS

This application is a continuation of International Patent Application No. PCT/CN2008/072225 with an international filing date of Sep. 1, 2008, designating the United States, now pending, and further claims priority benefits to Chinese Patent Application No. 200710053792.9 filed Nov. 8, 2007. The contents of all of the aforementioned applications, including any intervening amendments thereto, are incorporated herein by reference.

BACKGROUND OF THE INVENTION

1. Field of the Invention

The invention relates to a dry adhesive and a preparation method thereof, and more particularly to a red and green dry adhesive for stone adhesion and a preparation method thereof.

2. Description of the Related Art

Stone as a decorative material for curtain walls have become increasingly popular. However, conventional cement wet-paving methods easily result in stone diseases such as water spots, rust, alkalization, etc., and due to the difference in the expansion coefficient between cement and stone, there also exist hidden dangers. Curtain wall dry hanging technology solves these problems to some extent and offers favorable market prospects for dry adhesives that exhibit good adhesion strength and weather resistance.

Currently, construction techniques for dry hanging of stone are done by various methods. These include a stainless steel anchoring method, a direct pasting method, a direct steel pasting method, a transition pasting method, and an anchoring transition pasting method, among which the direct pasting method and stainless steel anchoring method are the most widely used since the installation height of decorative stone is often less than 9 m.

For the direct pasting method, conventional adhesives merely emphasize strength, and the strength is usually low and the weather resistance is poor. Further, the color difference of components A and B of dry adhesives on the market are not visually significant, resulting in difficulty in visual mixing or an uneven stirring that results in an incomplete cure and penetration. Stone is a porous material and thus when incomplete cure components penetrate into the stones, the surface is stained, hard to clean and remove, and the stone loses its original luster.

SUMMARY OF THE INVENTION

In view of the above-described problems, it is one objective of the invention to provide a dry adhesive that has high strength, good weather resistance, and is easily identified.

It is another objective of the invention to provide a preparation method for a dry adhesive that has high strength, good weather resistance, and is easily identified.

To achieve the above objectives, in accordance with one embodiment of the invention, there is provided a dry adhesive that has high strength, good weather resistance, and is easily identified. The dry adhesive comprising component A and component B, wherein the component A is red and comprises:
1) between 20 and 30 parts of an epoxy resin;
2) between 0 and 3 parts of a coupling agent;
3) between 1 and 5 parts of an active diluting agent;
4) between 20 and 60 parts of an inorganic filler; and
5) between 0.1 and 1 part of a red organic paste (acidic, alkaline, or neutral);
and component B is green and comprises:
1) between 5 and 15 parts of an organic compound-modified amine as a curing agent;
2) between 3 and 5 parts of the coupling agent;
3) between 15 and 50 parts of the inorganic filler;
4) between 3 and 10 parts of an accelerator;
5) between 0 and 5 parts of a thickener;
6) between 0 and 5 parts of the active diluting agent; and
7) between 0.1 and 2 parts of a green organic paste.

In a class of this embodiment, component A is mixed with component B to yield a white composition.

In a class of this embodiment, the red organic paste is lithol red, pigment red, toluidine red, permanent red, or a mixture thereof.

In a class of this embodiment, the green organic paste is prepared by mixing benzimidazolone azo yellow, isoindolinone yellow, medium chrome yellow, aniline yellow, or a mixture thereof with fluorescent blue and/or phthalocyanine blue.

In a class of this embodiment, the epoxy resin is bisphenol A diglycidyl ether, bisphenol F diglycidyl ether, propenyl diglycidyl ether, epoxypropane butylether, hexanediol diglycidyl ether, polyglycidyl ether, or a mixture thereof.

In a class of this embodiment, the organic compound-modified amine has a low molecular weight of polyamide, phenolic aldehyde amine, fatty amine, alicyclic amine, aromatic amine, or a mixture thereof.

In a class of this embodiment, the inorganic filler is calcium carbonate, silicon powder, barium sulfate, aluminum oxide, magnesium oxide, talc powder, silica, bentonite, titanium dioxide, or a mixture thereof.

In a class of this embodiment, the coupling agent is vinyl silane, 3-propyltrimethoxysilane, 3-aminopropyl triethoxysilane, anilinomethyltriethoxysilane, or a mixture thereof.

In a class of this embodiment, the accelerator is 2,4,6-tri (dimethylamino) phenol, N,N-dimethyl benzylamine, N,N-dimethyl aniline, p-hydroxyethyl diamine, or a mixture thereof.

In a class of this embodiment, the thickener is hydroxyethylcellulose.

In accordance with another embodiment of the invention, a preparation method is provided for a dry adhesive, the dry adhesive comprising component A and component B. Component A comprising:
1) between 20 and 30 parts of an epoxy resin (network frame);
2) between 0 and 3 parts of a coupling agent;
3) between 1 and 5 parts of an active diluting agent;
4) between 20 and 60 parts of an inorganic filler (enhancement); and
5) between 0.1 and 1 part of a red organic paste;
and component B comprising:
1) between 5 and 15 parts of an organic compound-modified amine as a curing agent;
2) between 3 and 5 parts of the coupling agent;
3) between 15 and 50 parts of the inorganic filler (enhancement);
4) between 3 and 10 parts of an accelerator;
5) between 0 and 5 parts of a thickener;
6) between 0 and 5 parts of the active diluting agent; and
7) between 0.1 and 2 parts of a green organic paste;
wherein the method comprises the steps of:
1) adding the coupling agent to the active diluting agent at normal temperature and pressure, uniformly mixing, adding the epoxy resin at a speed of between 50 and 100 rpm, uniformly mixing, adding the inorganic filler and the red organic paste sequentially, dispersing for 40 min, and grinding to yield the red component A; and 2) adding the coupling agent to a mixture of the organic compound-modified amine, the active diluting agent, and the accelerator at normal temperature and pressure, uniformly mixing, adding the inorganic filler, the thickener, and the green organic paste, and dispersing for 40 min to yield the green component B.

Component A is mixed with the component B to yield a white composition.

Advantages of the invention are summarized below: the dry adhesive has good adhesion performance and weather resistance; resins formed by the dry adhesive do not flow and have no shrinkage; the operation is easy, rapid, and can be accurately positioned; the degree of uniform mixing can be accurately determined, and the construction quality is very high.

Component A and component B of the dry adhesion of the invention have a significant color difference, and after being mixed produces a white composition. The visual color difference benefits proportion control and field construction, avoids human judgment errors, decreases the chance of contaminating the stone, improves the properties of the dry adhesive, and ensures construction quality.

Tests show the technical index of the dry adhesives of the invention is superior to that of national standards. A comparison is listed below:

A aging properties are obtained from mechanical tests under heat treatment.

| No. | Items | | Technical index | Measured data |
|---|---|---|---|---|
| 1 | Pot life (min) | | >30-90 | 45 |
| 2 | Modulus of bending (Mpa) | | ≥2000 | 3355.0 |
| 3 | Impact strength (KJ/m²) | | ≥3.0 | 3.68 |
| 4 | Tensile shear strength (Mpa) | | ≥8.0 | 15.6 |
| 5 | Compression shear strength (Mpa) | Stone-stone | Standard 48 h | ≥10.0 | 13.0 |
| | | | Immersed in water 168 h | ≥7.0 | 11.8 |
| | | | Heat treatment 80° C., 168 h | ≥7.0 | 17.1 |
| | | | Freeze-thaw cycles 50 times | ≥7.0 | 12.6 |

The adopted standard for comparison comprises Epoxy Adhesives Used for Dry-Hanging Stones (JC 887-2001).

The test for Pot life is based on Test 5.6 of GB/T 12954-1991.

The test for Modulus of bending is based on GB/T 2570.

The test for Impact strength is based on GB/T 2571, and small specimens without gaps are adopted.

The test for Tensile shear strength is based on GB/T 7124, and arithmetic mean value from five specimens is practicable.

The test for Compression shear strength is based on Test 6.3.4 of JC/T 547-1994.

DETAILED DESCRIPTION OF THE EMBODIMENTS

To further illustrate the invention, experiments detailing a dry adhesive and a preparation method thereof are described below. It should be noted that the following examples are intended to describe and not to limit the invention.

EXAMPLE 1

A dry adhesive comprises component A and component B. Component A comprises 20 parts of an epoxy resin, one part of an active diluting agent, 20 parts of an inorganic filler, and 0.1 part of lithol red (red organic paste). Component B comprises 5 parts of an organic compound-modified amine, 3 parts of a coupling agent, 15 parts of the inorganic filler, 3 parts of an accelerator, and 0.1 part of a mixture of benzimidazolone azo yellow and fluorescent blue (green organic paste).

The epoxy resin is a mixture of bisphenol A diglycidyl ether and bisphenol F diglycidyl ether. The organic compound-modified amine is a mixture of a low molecular weight of polyamide and phenolic aldehyde amine. The inorganic filler is a mixture of calcium carbonate and silicon powder. The coupling agent is a mixture of vinyl silane and 3-propyltrimethoxysilane. The accelerator is a mixture of 2,4,6-tri (dimethylamino) phenol and N,N-dimethyl benzylamine. The thickener is hydroxyethylcellulose.

A preparation method for the dry adhesive comprises the following steps:

1) at normal temperature and pressure, adding the epoxy resin, the inorganic filler, and the red organic paste sequentially at a speed of between 50 and 100 rpm, dispersing for 40 min (time is shorter or longer accordingly), and grinding with a three-roll mill to yield a pink component A; and 2) adding the coupling agent to a mixture of the organic compound-modified amine and the accelerator at normal temperature and pressure, uniformly mixing, adding the inorganic filler and the green organic paste, and dispersing for 40 min (time is shorter or longer accordingly) to yield a green component B.

EXAMPLE 2

A dry adhesive comprises component A and component B. Component A comprises 30 parts of an epoxy resin, 3 parts of a coupling agent, 5 parts of an active diluting agent, 60 parts of an inorganic filler, and one part of a red organic paste. Component B comprises 15 parts of an organic compound-modified amine, 5 parts of a coupling agent, 50 parts of an inorganic filler, 10 parts of an accelerator, 5 parts of a thickener, 5 parts of an active diluting agent, and 2 parts of a green organic paste.

The red organic paste is a mixture of lithol red, pigment red, toluidine red, and permanent red. The green organic paste is a mixture prepared by mixing benzimidazolone azo yellow, isoindolinone yellow, medium chrome yellow, and aniline yellow with fluorescent blue and/or phthalocyanine blue. The epoxy resin is a mixture of bisphenol A diglycidyl ether, bisphenol F diglycidyl ether, propenyl diglycidyl ether, epoxypropane butylether, hexanediol diglycidyl ether and polyglycidyl ether. The organic compound-modified amine is a mixture of a low molecular weight of polyamide, phenolic aldehyde amine, fatty amine, alicyclic amine, and aromatic amine. The inorganic filler is a mixture of calcium carbonate, silicon powder, barium sulfate, aluminum oxide, magnesium oxide, talc powder, silica, bentonite, and titanium dioxide. The coupling agent is a mixture of vinyl silane, 3-propyltrimethoxysilane, 3-aminopropyl triethoxysilane, and anilinomethyltriethoxysilane. The accelerator is a mixture of 2,4, 6-tri (dimethylamino) phenol, N,N-dimethyl benzylamine, N,N-dimethyl aniline, and p-hydroxyethyl diamine. The thickener is hydroxyethylcellulose.

A preparation method for the dry adhesive comprises the steps of:

1) at normal temperature and pressure, adding the coupling agent into the active diluting agent, uniformly mixing, adding the epoxy resin, the inorganic filler, and the red organic paste sequentially at a speed of between 50 and 100 rpm, dispersing for 40 min, and grinding with a three-roll mill to yield a pink component A; and 2) adding the coupling agent to a mixture of the organic compound-modified amine, the active diluting agent, and the accelerator at normal temperature and pressure, uniformly mixing, adding the inorganic filler, the thickener, and the green organic paste, and dispersing for 40 min to yield a green component B.

EXAMPLE 3

A dry adhesive comprises component A and component B. Component A comprises 25 parts of an epoxy resin, 1.5 parts of a coupling agent, 3 parts of an active diluting agent, 40 parts of an inorganic filler, and 0.5 part of a red organic paste. Component B comprises 10 parts of an organic compound-modified amine, 4 parts of the coupling agent, 30 parts of the inorganic filler, 6 parts of an accelerator, 2 parts of a thickener, 2 parts of the active diluting agent, and one part of a green organic paste.

The red organic paste is a mixture of toluidine red and permanent red. The green organic paste is prepared by mixing aniline yellow with phthalocyanine blue. The epoxy resin is a mixture of hexanediol diglycidyl ether and polyglycidyl ether. The organic compound-modified amine is a mixture of alicyclic amine and aromatic amine. The inorganic filler is a mixture of talc powder, silica, and titanium dioxide. The coupling agent is a mixture of 3-propyltrimethoxysilane and anilinomethyltriethoxysilane. The accelerator is a mixture of N,N-dimethyl aniline and p-hydroxyethyl diamine. The thickener is hydroxyethylcellulose.

The preparation method for the dry adhesive is the same as that in Example 2.

EXAMPLE 4

A dry adhesive comprises component A and component B. Component A comprises 28 parts of an epoxy resin, 2 parts of a coupling agent, 4 parts of an active diluting agent, 50 parts of an inorganic filler, and 0.6 part of a red organic paste. Component B comprises 8 parts of an organic compound-modified amine, 5 parts of the coupling agent, 25 parts of the inorganic filler, 5 parts of an accelerator, 4 parts of the active diluting agent, and 1.5 parts of a green organic paste.

The red organic paste is red pigment. The green organic paste is a mixture prepared by mixing isoindolinone yellow and medium chrome yellow with fluorescent blue. The epoxy resin is a mixture of bisphenol F diglycidyl ether and propenyl diglycidyl ether. The organic compound-modified amine is a mixture of fatty amine and aromatic amine. The inorganic filler is a mixture of aluminum oxide, magnesium oxide, and talc powder. The coupling agent is a mixture of 3-propyltrimethoxysilane and 3-aminopropyl triethoxysilane. The accelerator is a mixture of N,N-dimethyl benzylamine.

The preparation method of the dry adhesive is the same as that in Example 2 except that there is no addition of a thickener to component B.

EXAMPLE 5

A dry adhesive comprises component A and component B. Component A comprises 22 parts of an epoxy resin, 0.5 parts of a coupling agent, 3 parts of an active diluting agent, 50 parts of an inorganic filler, and 0.7 part of a red organic paste. Component B comprises 12 parts of an organic compound-modified amine, 5 parts of the coupling agent, 40 parts of the inorganic filler, 9 parts of an accelerator, 4 parts of a thickener, and 1.1 parts of a green organic paste.

The red organic paste is a mixture of toluidine red and permanent red. The green organic paste is a mixture prepared by mixing benzimidazolone azo yellow and medium chrome yellow with fluorescent blue and phthalocyanine blue. The epoxy resin is a mixture of bisphenol F diglycidyl ether, propenyl diglycidyl ether, and hexanediol diglycidyl ether. The organic compound-modified amine is a fatty amine. The inorganic filler is a mixture of calcium carbonate, barium sulfate, magnesium oxide, and talc powder. The coupling agent is a mixture of vinyl silane and anilinomethyltriethoxysilane. The accelerator is a mixture of N,N-dimethyl aniline and p-hydroxyethyl diamine. The thickener is hydroxyethylcellulose.

The preparation method for the dry adhesive is the same as that in Example 2, except that there is no addition of an active diluting agent to component B.

EXAMPLE 6

A dry adhesive comprises component A and component B. Component A comprises 29 parts of an epoxy resin (network frame), one part of a coupling agent, 5 parts of an active diluting agent, 20 parts of an inorganic filler (enhancement), and 0.1 part of a red organic paste. Component B comprises 5 parts of an organic compound-modified amine, 3 parts of the coupling agent, 15 parts of the inorganic filler, 3 parts of an accelerator, 2 parts of a thickener, 4 parts of the active diluting agent, and 0.1 parts of a green organic paste.

The red organic paste is a mixture of permanent red. The green organic paste is a mixture prepared by mixing medium chrome yellow with fluorescent blue. The epoxy resin is a mixture of epoxypropane butylether and polyglycidyl ether. The organic compound-modified amine is a mixture of phenolic aldehyde amine and alicyclic amine. The inorganic filler is a mixture of calcium carbonate, silicon powder, talc powder, and silica. The coupling agent is 3-propyltrimethoxysilane. The accelerator is N,N-dimethyl benzylamine. The thickener is hydroxyethylcellulose.

The preparation method for the dry adhesive is the same as that in Example 2.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A dry adhesive comprising component A and component B, wherein
   component A is red and comprises an epoxy resin, a first coupling agent, a first active diluting agent, a first inorganic filler and a red organic paste in a weight ratio of 20-30 : 0-3 : 1-5 : 20-60 : 0.1-1; and
   component B is green and comprises a curing agent, a second coupling agent, a second inorganic filler, an accelerator, a thickener, a second diluting agent, and a green organic paste in a weight ratio of 5-15 : 3-5 : 15-50 : 3-10 : 0-5 : 0-5: 0.1-2;
wherein:

said epoxy resin is a mixture of bisphenol A diglycidyl ether and bisphenol F diglycidyl ether; said red organic paste is lithol red; said curing agent is a mixture of a low molecular weight polyamide and phenolic aldehyde amine; said green organic paste is a mixture of benzimidazolone azo yellow and fluorescent blue; and said first and second inorganic fillers are independently a mixture of calcium carbonate and silicon powder; or said epoxy resin is a mixture of bisphenol A diglycidyl ether, bisphenol F diglycidyl ether, propenyl diglycidyl ether, epoxypropane butylether, hexanediol diglycidyl ether, and polyglycidyl ether; said red organic paste is a mixture of lithol red, pigment red, toluidine red, and permanent red; said curing agent is a mixture of a low molecular weight polyamide, phenolic aldehyde amine, fatty amine, alicyclic amine, and aromatic amine; said green organic paste is a mixture of benzimidazolone azo yellow, isoindolinone yellow, medium chrome yellow, aniline yellow, and fluorescent blue; and said first and second inorganic fillers are independently a mixture of calcium carbonate, silicon powder, barium sulfate, aluminum oxide, magnesium oxide, talc powder, silica, bentonite, and titanium dioxide; or said epoxy resin is a mixture of hexanediol diglycidyl ether and polyglycidyl ether; said red organic paste is a mixture of lithol red and permanent red; said curing agent is a mixture of alicyclic amine and aromatic amine; said green organic paste is a mixture of aniline yellow and phthalocyanine blue; and said first and second inorganic fillers are independently a mixture of talc powder, silica, and titanium dioxide; or said epoxy resin is a mixture of bisphenol F diglycidyl ether and propenyl diglycidyl ether; said red organic paste is pigment red; said curing agent is a mixture of fatty amine and aromatic amine; said green organic paste is a mixture of isoindolinone yellow, medium chrome yellow, and fluorescent blue; and said first and second inorganic fillers are independently a mixture of aluminum oxide, magnesium oxide, and talc powder; or said epoxy resin is a mixture of bisphenol F diglycidyl ether, propenyl diglycidyl ether, and hexanediol diglycidyl ether; said red organic paste is a mixture of toluidine red and permanent red; said curing agent is a fatty amine; said green organic paste is a mixture of benzimidazolone azo yellow, medium chrome yellow, fluorescent blue, and phthalocyanine blue; and said first and second inorganic fillers are independently a mixture of calcium carbonate, barium sulfate, magnesium oxide, and talc powder; or said epoxy resin is a mixture of epoxypropane butylether and polyglycidyl ether; said red organic paste is permanent red; said curing agent is a mixture of a phenolic aldehyde amine and alicyclic amine; said green organic paste is a mixture of medium chrome yellow and fluorescent blue; and said first and second inorganic fillers are independently a mixture of calcium carbonate, silicon powder, talc powder, and silica.

2. The dry adhesive of claim 1, wherein said component A is mixed with said component B to yield a white composition.

3. The dry adhesive of claim 1, wherein said accelerator is 2,4,6-tri(dimethylamino) phenol, N,N-dimethyl benzylamine, N,N-dimethyl aniline, p-hydroxyethyl diamine, or a mixture thereof.

4. The dry adhesive of claim 1, wherein said first coupling agent and second coupling agent are selected from 3-propyltrimethoxysilane, 3-aminopropyl triethoxysilane, anilinomethyltriethoxysilane, or a mixture thereof.

* * * * *